(12) United States Patent
Elberse

(10) Patent No.: US 7,225,232 B2
(45) Date of Patent: May 29, 2007

(54) USING EXISTING WEB-BASED INFORMATION TO GENERATE RESPONSES TO USER QUERIES

(75) Inventor: Arik Elberse, Galway (IE)

(73) Assignee: Nortel Networks Limited,, St. Laurent, Quebec (CA)

( * ) Notice: Subject to any disclaimer, the term of this patent is extended or adjusted under 35 U.S.C. 154(b) by 411 days.

(21) Appl. No.: 10/109,240

(22) Filed: Mar. 28, 2002

(65) Prior Publication Data

US 2003/0188037 A1  Oct. 2, 2003

(51) Int. Cl.
*G06F 15/16* (2006.01)

(52) U.S. Cl. ............ 709/206; 709/201; 709/202; 709/238; 719/311; 719/313; 719/317

(58) Field of Classification Search ............ 709/200, 709/202
See application file for complete search history.

(56) References Cited

U.S. PATENT DOCUMENTS

| | | | |
|---|---|---|---|
| 5,793,964 A * | 8/1998 | Rogers et al. ............ 709/202 |
| 6,260,050 B1 * | 7/2001 | Yost et al. ............ 715/501.1 |
| 6,510,469 B1 * | 1/2003 | Starnes et al. ............ 709/247 |
| 6,687,877 B1 * | 2/2004 | Sastry et al. ............ 715/512 |
| 6,757,709 B1 * | 6/2004 | Oberdorfer ............ 709/203 |
| 6,889,222 B1 * | 5/2005 | Zhao ............ 707/3 |

* cited by examiner

*Primary Examiner*—William Thomson
*Assistant Examiner*—Andy Ho
(74) *Attorney, Agent, or Firm*—Barnes & Thornburg, LLP

(57) ABSTRACT

Email response management systems (ERMSs) have previously been developed for use with contact centers where email queries are received from customers. These ERMSs have contained pre-configured information suitable for incorporating into email responses. A major problem with this approach is that a large amount of work is required to pre-configure the information and to add that to the ERMS. A method and system are provided for enabling existing web-based information to be used to formulate such responses, not just for email but also for other media such as text chat, SMS, video, and more. The existing web-based information does not need to be altered or dedicated for a particular response management system and contact centre. Rather it can be pre-existing information used for other purposes.

31 Claims, 5 Drawing Sheets

USING EXISTING WEB-BASED INFORMATION TO GENERATE RESPONSES TO USER QUERIES

FIELD OF THE INVENTION

The present invention relates to a method and apparatus for enabling web-based information to be used to generate responses to user query messages. The invention is particularly related to but in no way limited to contact centres.

BACKGROUND TO THE INVENTION

There are many situations in which it is required to generate responses to user queries. For example, contact centres such as customer service centres, mail order purchase centres, ticket sales centres and the like. In addition, there is an increasing need for such responses to be provided without the need for an actual conversation between the customer and a customer service representative. For example, there is a increasing need for responses to be provided in written form, for example as email messages, text chat or short message service (SMS) text messages.

As the volume of such responses that are required increases there is a requirement to enable those responses to be generated in a quick and efficient manner whilst being of a high quality.

With respect to email responses, so called email response management systems (ERMSs) have previously been developed for use with contact centres where email queries are received from customers. These ERMSs have contained pre-configured information suitable for incorporating into email responses. That pre-configured information is presented to contact centre agents who decide which items of the information to include in a particular response.

A major problem with this approach is that a large amount of work is required to pre-configure the information and to add that to the ERMS. Also, it is often the case that the contact centre agent is required to copy and paste the information into the response which is time consuming, error-prone and inefficient. In addition, the format of the information needs to be either pre-configured or adjusted to fit the format required for the response.

An object of the present invention is to provide a method and apparatus for enabling web-based information to be used to generate responses to user query messages which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention there is provided a method of enabling web-based information to be used to generate a response to a user query message, said method comprising the steps of:
  receiving requested web-based information at a web-browser together with one or more indicators, each indicator being associated with a particular part of the web-based information and also associated with a message arranged to send the particular part of the web-based information to a management system at a pre-specified location;
  receiving user input selecting at least one of the indicators and executing the message associated with that indicator such that the associated particular part of the web-based information is sent to the management system for incorporation in the response.

For example the method may be provided at a contact centre operator station which has a web-browser and where the contact centre station is one of a plurality of such stations managed by a management system. User queries are received at the management system and allocated to one of the call centre stations An operator at that station creates a response to the user query. Whilst this response is being created it is held at the management system or operator station and once finished is sent from there to the user. The indicators are preferably web-page links which when selected initiate an HTTP POST command or equivalent. The POST command or equivalent causes associated web-based information to be sent to the management system for incorporation into a response. By using this method, web-based information can be used to create responses to user queries in a simple and efficient manner. This eases the work load of the contact center agent or operator using the contact centre operator station and enables high quality responses to be created.

In one embodiment the agent at the contact centre operator station requests the web-based information. For example, the method further comprises, prior to said step of, receiving, the step of requesting the web-based information from a web-server using the web-browser. This provides a simple and effective way in which the agent is able to obtain information for incorporation into a user response.

In an alternative embodiment the web-based information is provided to the web-browser by an automatic response generation system. This provides the advantage that no action on the part of the agent is required in order to find suitable web-based information for a particular response. For example, an email query from a customer reaches the management system and is forwarded to an automatic response generation system. That automatic response generation system forms a web-page containing various possible information for use by the agent in formulating a response. That web page or a reference to it is then sent to the contact centre operator station.

Preferably the method comprises sending information about the identity of the web-browser or web browser user to the management system together with the particular part of the web-based information. This is advantageous in the case that a plurality of call centre operator stations are managed by the management system. In that case, the management system is able to determine which call centre operator station the particular web-based information is associated with.

The management system itself may be selected from an email response management system and a text-chat management system. However, these are only examples. The management system may be of any suitable type that receives queries from users and issues replies to those queries where the replies comprise web-based information or information which could be provided or referenced through a web browser.

In a preferred embodiment said step of requesting web-based information from a web-server comprises issuing a request from the web-browser to a web-server via a web-server proxy. For example, said web-server proxy is arranged to add said indicators to said web-based information dynamically. This provides the advantage that any type of web-server holding web-based information may be used.

It is not essential for that web-server to hold information that has been pre-configured to comprise the associated indicators and messages.

In another embodiment the indicators associated with particular parts of the web-based information are pre-specified and stored at the web-server together with the web-based information.

Preferably said message comprises a hyper-text transfer protocol (HTTP) POST command. However, this is not essential. The message may comprise any suitable type of command which causes the associated web-based information to be sent to the management system.

Preferably the particular part of the web-based information is incorporated into the response without changing the format of the particular part of the web-based information. This provides the advantage that it is not necessary to carry out extra processing to reformat the information. The web-based information is simply used in its existing format.

According to another aspect of the present invention there is provided a system for enabling web-based information to be used to generate a response to a user query message, said system comprising:
- a web-browser arranged to receive requested web-based information together with one or more indicators, each indicator being associated with a particular part of the web-based information and also associated with a message arranged to send the particular part of the web-based information to a management system at a pre-specified location;
- a user-interface arranged to receive user input selecting at least one of the indicators; and
- a processor arranged to execute, in the event that an indicator is selected, the message associated with that indicator such that the associated particular part of the web-based information is sent from the web-browser to the management system for incorporation in the response.

For example, the system can be provided at a contact centre operator station as mentioned above.

In one example the system further comprises a web-server comprising the web-based information, associated indicators and associated messages.

In another example the system further comprises a plurality of web servers comprising the web-based information and a web-server proxy which is arranged to provide the indicators and messages associated with the web-based information.

According to another aspect of the present invention there is provided a is contact centre management system for use in a contact centre comprising a plurality of contact centre operator stations each with a web-browser, said contact centre management system comprising:
- an allocator arranged to allocate incoming query messages between the contact centre operator stations;
- an output arranged to send responses to the query messages;
- a processor arranged, for each operator station, to maintain at least one active response to a query message that is in the process of being formulated by an operator at that operator station;
- an input arranged to receive a message from a web-browser at any of the contact centre operator stations said message being arranged to cause associated web-based information to be sent to the contact centre management system; and wherein said processor is further arranged to input said web-based information into an active query message response.

This provides the advantage that the contact centre management system is able to form query message responses in a simple and efficient manner.

Preferably the processor is arranged to input the web-based information into an active response without substantially changing the format of the web-based information.

According to another aspect of the present invention there is provided a method of operating a contact centre management system in a contact centre comprising a plurality of contact centre operator stations each with a web-browser, said method comprising the steps of:
- receiving at least one query message and allocating that query message to one of the contact centre operator stations;
- maintaining an active query message response which is in the process of being formulated by the associated contact centre operator;
- receiving a message from a web-browser at the associated contact centre operator station; said message being arranged to cause associated web-based information to be sent to the contact centre management system; and
- inputting said web-based information to the active query message response.

The present invention also encompasses a computer program stored on a computer readable medium and arranged to carry out any of the methods described above.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
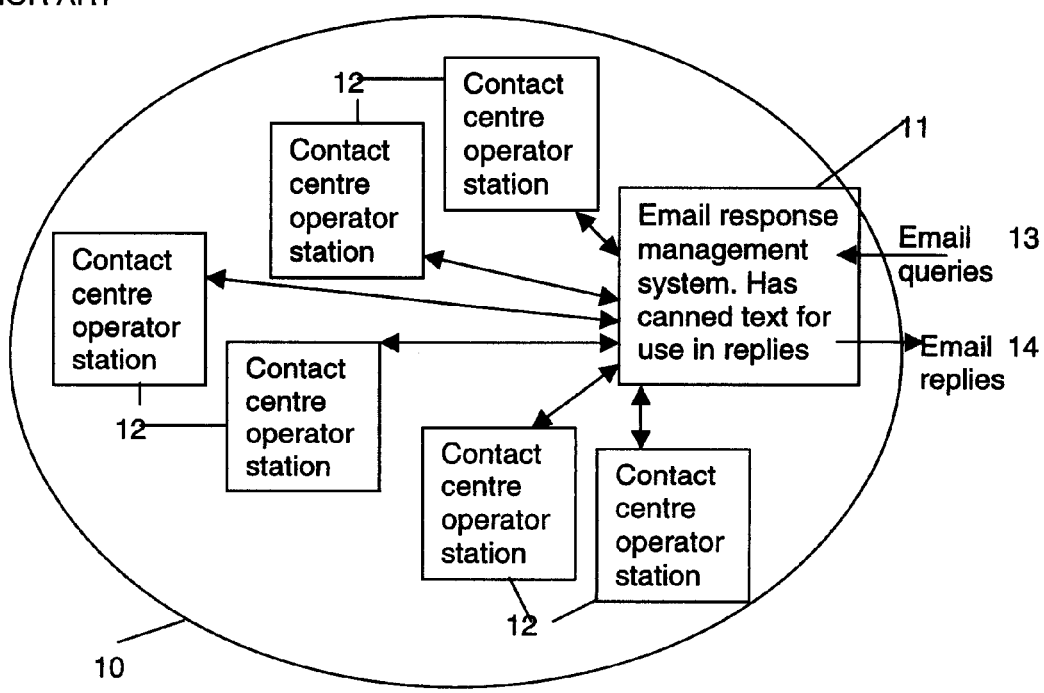
FIG. 1 is a schematic diagram of an email response management system in a contact centre according to the prior art.

As mentioned above, prior art contact centres have used email response management systems (ERMSs) and an example is illustrated schematically in FIG. 1. A contact centre 10 comprises a plurality of contact centre operator stations 12 each of which is able to communicate with an ERMS 11. Email queries 13 from customers are received at the ERMS 11 and routed to one of the contact centre operator stations 12. Once a reply 14 to a particular email query has been formulated this is sent to the appropriate customer by the ERMS. In the example shown the ERMS has canned text for use in replies. That is, the ERMS comprises pre-configured information that can be used as part of the email replies. As an operator at one of the stations is formulating a reply, that operator is presented with suggested items of the canned text and is able to copy and paste those into the reply. Alternatively, selected items of the canned text are automatically inserted into the reply by the ERMS when requested by the operator station as a result of input by an operator. In another situation, the ERMS does not have canned text for use in replies. Rather, operators at any of the operator stations independently access other authorised information sources, such as web-sites, and copy and paste information from those sources into the replies. However, as mentioned above this is time consuming and error prone. The other option of having canned text at the ERMS is also disadvantageous in that it is time consuming to pre-configure that information and provide it at the ERMS. In addition the canned text needs to be formatted correctly for the particular type of replies involved.

The present invention addresses these problems by enabling existing web-based information to be used in formulating the replies without the need for the operators to copy and paste that information or for reformatting of the information to be done.

Figure 2:
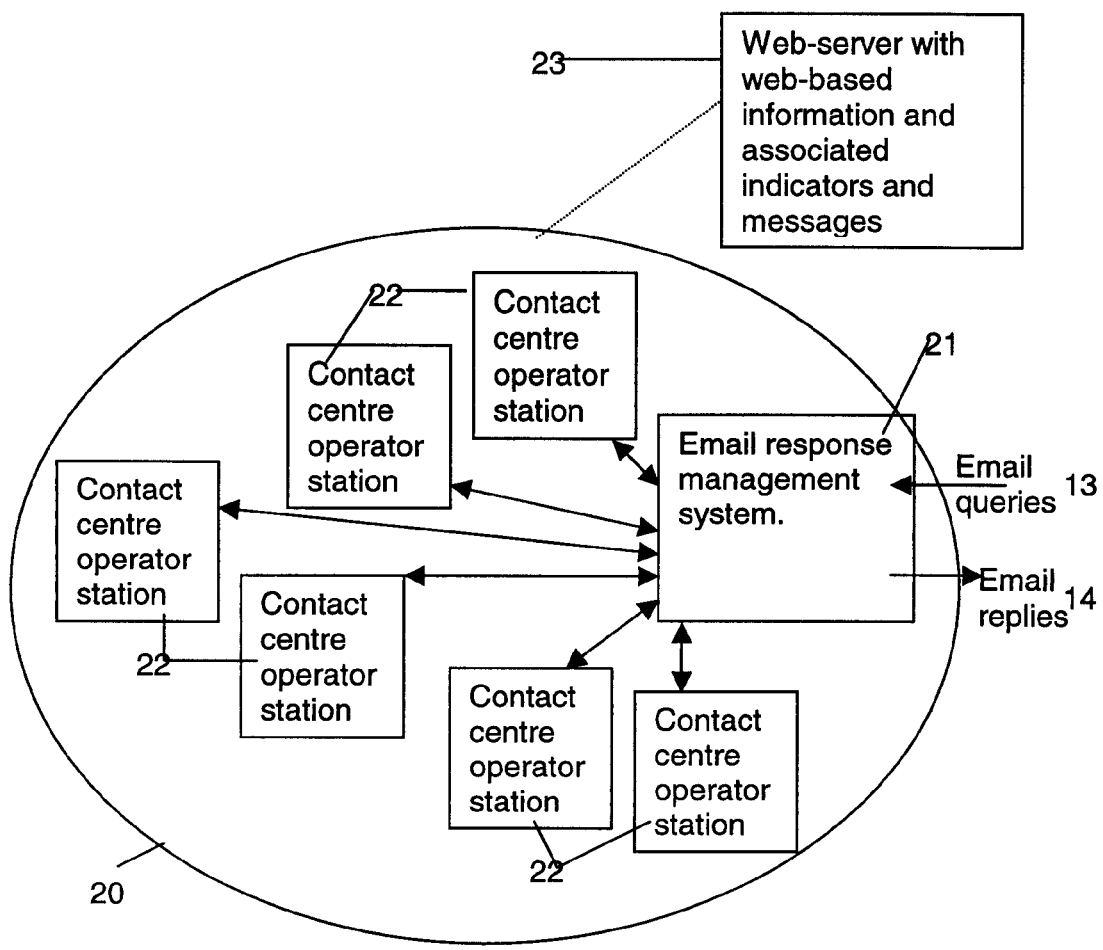
FIG. 2 is a schematic diagram of a system for generating responses to user queries according to an embodiment of the present invention.

A first embodiment of the present invention is illustrated in FIG. 2. This shows a contact centre 20 with a plurality of contact centre operator stations 22 in a similar manner to that of FIG. 1. There is an ERMS 21 in communication with each of the operator stations 22. However, the ERMS itself does not contain canned text for use in replies. Instead a web-server 23 is provided which is in communication with each of the contact centre operator stations 22. The web-server is not necessarily dedicated for use by the contact centre. For example, the web-server is advantageously pre-existing and used to provide other services to other end users. In one example, the contact centre provides product support to customers. An enterprise which provides the products has an intranet which comprises one or more web-servers holding information about its products. That information is made available to employees of the enterprise to enable them to go about their work of for example designing, manufacturing and marketing the products. Customers who have bought products of the enterprise are able to use the contact centre to obtain support. Instead of providing dedicated, pre-configured information in the ERMS of the contact centre, information already available on the enterprise's intranet is used. This is achieved by enabling the contact centre operator stations to communicate with one or more web-servers on the enterprise's intranet. Web-based information can be accessed from those web-servers and used by contact centre operators to formulate replies. This avoids the need for pre-configured information to be provided in the ERMS itself. In this way the contact centre is quickly and simply provided with the information it needs.

Figure 3:
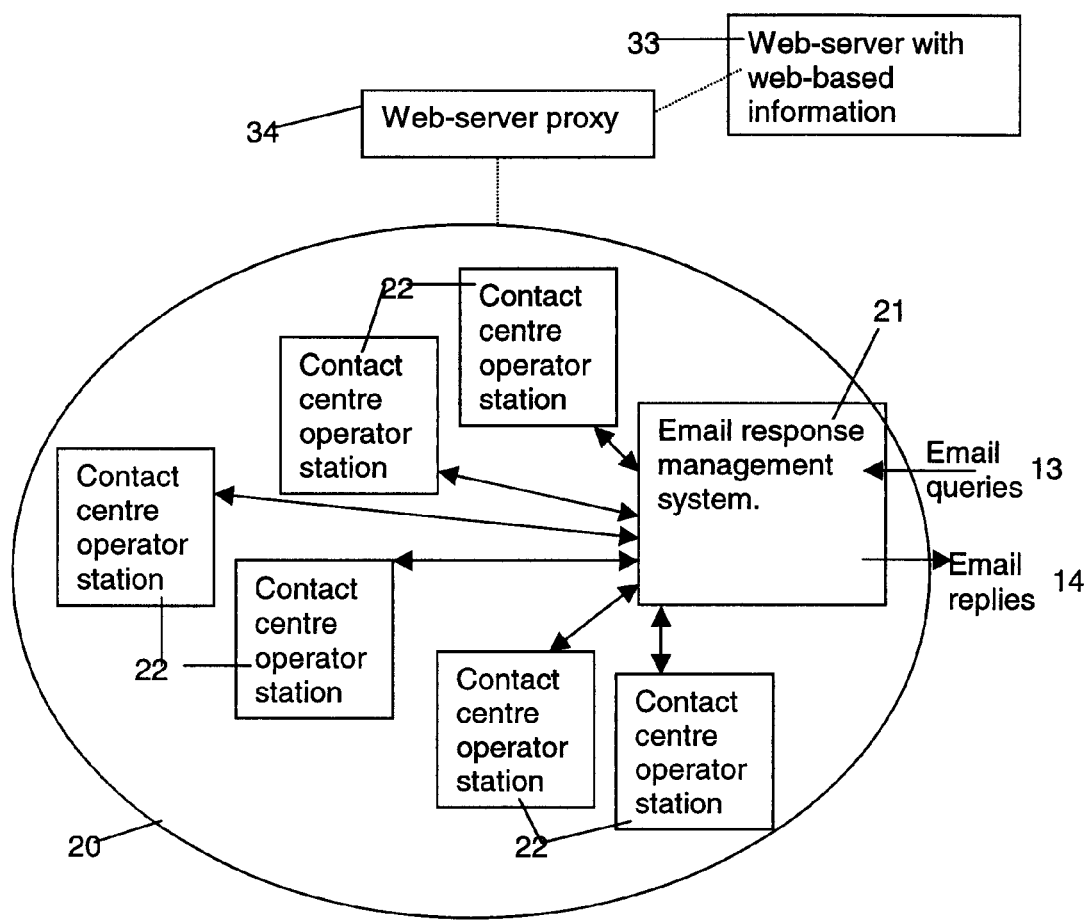
FIG. 3 is a schematic diagram of a system for generating responses to user queries according to another embodiment of the present invention.

In the example discussed above the web-server is part of an enterprise network and the enterprise also operates the contact centre. However, this is not essential. Those two entities may be independently provided Also, to enable the contact centre operators to incorporate parts of the web-based information into their replies, indicators and messages are associated with the web-based information (see box 23 in FIG. 2). In one example, this is achieved by pre-specifying the indicators and messages and storing those in association with the web-based information at the web-server 23. However, this is not essential. In another embodiment as illustrated in FIG. 3, a web-server proxy 34 is used to dynamically add indicators and messages to the web-based information.

The indicators are preferably web links associated with a message which is an HTTP POST command. However, this is not essential. The indicators can be any suitable item which can be displayed to a user and when selected by that user identifies a particular part of the web-based information. Also, the message is not necessarily an HTTP POST command. Any suitable message can be used which when activated causes the associated part of the web-based information to be sent to the ERMS for incorporation into a reply. This is preferably done without changing the format of the web-based information.

Figure 5:
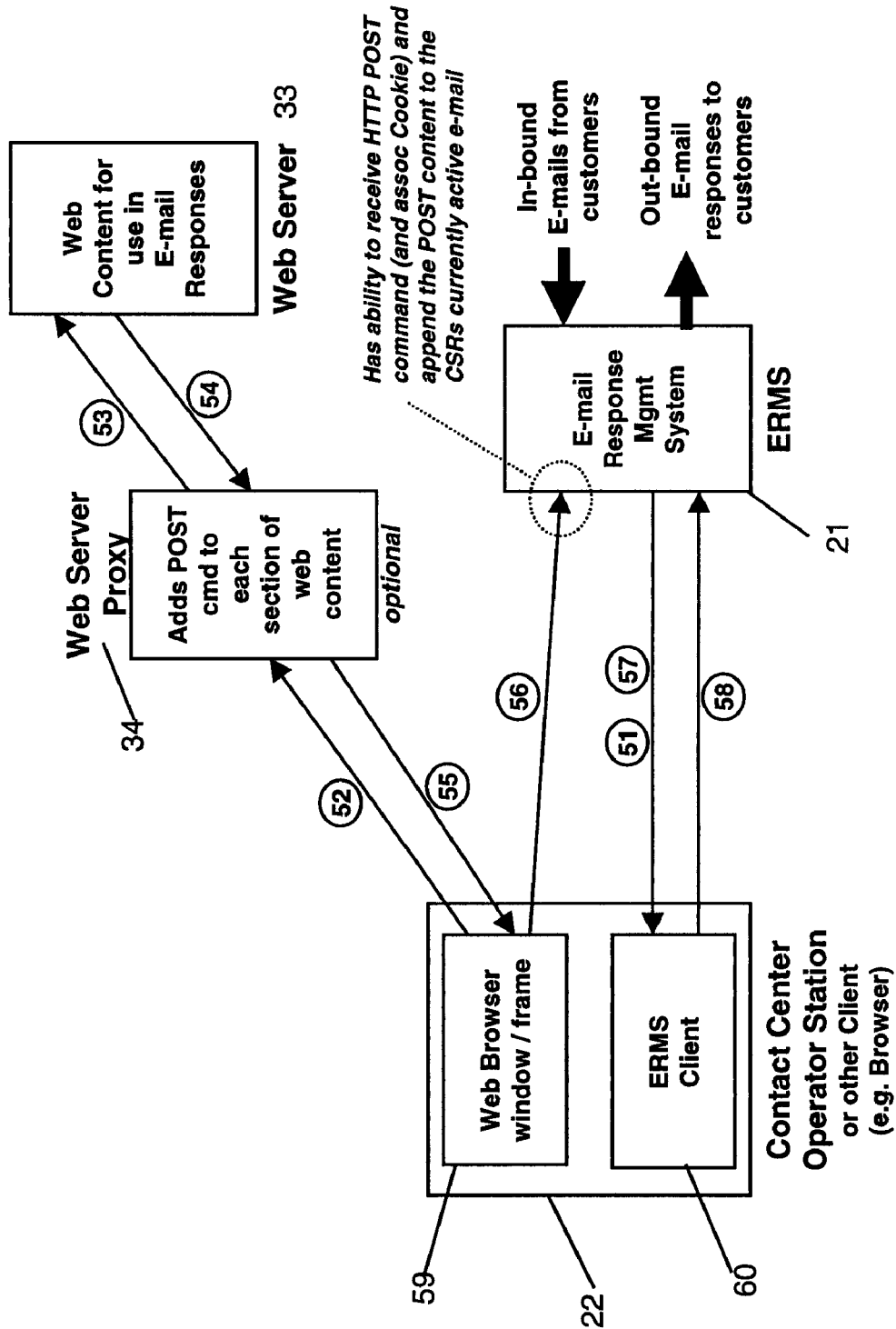
FIG. 5 is a schematic diagram of part of the arrangement of FIG. 3 showing more detail.

As illustrated in FIG. 5, each contact centre operator station 22 comprises a web-browser 59 or other suitable means for communicating with the web-server 23, 33 or web-server proxy 34. Also, each contact centre operator station comprises ERMS client software 60 which enables the station to communicate and operate in conjunction with the ERMS 21 itself.

Thus considering the arrangement of FIG. 2, email queries 13 are received from customers at the ERMS 21. The ERMS has access to information about the various contact centre operator stations and allocates an incoming email query to one of those stations as appropriate. For example, this is done taking into account the current state of those stations, the skill sets of the operators using the stations and other factors as known in the art.

An operator at the receiving contact centre operator station, views the email query 13 and thinks about how best to formulate a response. A draft response is held at the ERMS or the contact centre operator station and the operator is able to add text or other materials and attachments to that draft response, edit and work on that draft, until he or she is satisfied with the response. At that point the operator is able to instruct the ERMS to send the response to the appropriate customer. A given operator may have several draft responses pending at any one time and of those, one response is said to be "active". That is the response that the operator is currently working on.

Consider a particular example in which the customer email query is a request for information about the capabilities of a new version of one of the enterprise's products. The operator searches the enterprise's intranet using the web-browser at the operator station and finds relevant information at a web-server 23. In the situation shown in FIG. 2, the web-based information is already associated with indicators and messages. The operator browses web-pages provided by the web-server and reviews the information given. This could comprise text, brochure attachments, tables, drawings, or any other suitable web-based information. Links or other indicators are shown next to parts of the information, for example, next to a brochure or a table. The operator decides that one part of the web-based information would be usefully added to a reply that he or she is working on and selects the associated link. For example, this could be a web-link with the words "insert brochure into response". When the operator selects that link, the associated message is activated which causes the brochure to be sent to the ERMS for incorporation (e.g. attachment) into the active response. This process is then repeated as appropriate until the operator has added as many items of web-based information to the active response as required.

Together with the web-based information sent to the ERMS, information about the identity of the operator station is also provided to the ERMS. This enables the web-based information to be added to the active response for the appropriate operator. This can be achieved in any suitable manner, and one example using a cookie mechanism is described below.

Now considering the arrangement of FIG. 3 in which a web-server proxy 34 is used. FIG. 5 shows part of the arrangement of FIG. 3 in more detail and the same reference numerals are used for corresponding components in FIGS. 2, 3 and 5. The arrows 51 to 58 in FIG. 5 are used to represent method steps as now described.

An email query is received from a customer (or any other suitable entity) and routed by the ERMS 21 to one of the plurality of contact centre operator stations 22. In FIG. 5 this routing step is shown as arrow 51 and shows the ERMS client 60 at the operator station receiving the email query. At the operator station, an operator is able to access the email query and consider what response is required The operator uses the web-browser 59 at the station to access a web-server 33 via a web-server proxy 34. This process is preferably arranged to be transparent to the operator. That is, the operator is unaware that access to the web-server is via a proxy. Arrow 52 in FIG. 5 represents a request from the web-browser to the web-server proxy 34 to access the web-server 33. This request is forwarded from the proxy 34 to the web-server 33. The requested web-based information is then returned from the web-server 33 to the web-proxy 34 as known in the art. However, at the proxy, information is added to the web-based information. That is, indicators and associated messages are added. For example, web-links are inserted to the web-based information with HTTP POST commands and this is done for sections of web-based information such as individual pictures, tables, charts, paragraphs of text, brochures and other documents. The indicators are preferably hyperlinks or icons which when selected cause the associated HTTP POST command to be activated.

The modified web-based information, for example, in the form of a web-page, is then returned to the web-browser (see arrow 52 in FIG. 5) and presented to the operator. The only visible difference from the original web-based information provided by the web-server 33 itself is that icons, hyperlinks or other indicators are present associated with particular parts of the web-based information.

Steps 51 to 52 are then repeated as necessary until the operator has found relevant web-based information. Once the operator has achieved that, he or she selects the associated indicator such as an icon with the word "insert". By making that selection an HTTP POST (or GET) command is activated which causes the associated web-based information to be transferred to the ERMS 21 as part of that command. However, this is not essential. Any suitable mechanism for causing the associated web-based information to be transferred to the ERMS 21 can be used. This is illustrated as arrow 66 in FIG. 5. In this way the operator is quickly and easily able to add appropriate information to the active response. It is not necessary for the operator to make time consuming and error prone "cut" and "paste" actions or for the operator to re-format the information once it has been added to the active response.

The format of the message and the associated HTTP POST command may also include a means, such as the POST to (HTTP) address or an XML description, to indicate how the web-based information is to be incorporated into the response. Examples of different ways of incorporating the web-based information into the response include direct insertion as HTML, conversion to plain text, including the information as an e-mail attachment or as a URL reference.

In addition, information is sent from the web-browser 59 to the ERMS 21 to identify the sending operator station. This is preferably achieved by sending a cookie from the web-browser to the ERMS.

A cookie is information stored on a client machine by a web-browser as a result of access by that web-browser to a particular web-based entity. In the example shown in FIG. 5 the ERMS is effectively a web-based entity because it has the ability to receive HTTP POST commands. Thus in one embodiment, each operator station is required to register with the ERMS. This is done by using the web-browser 59 at the operator station to access the ERMS and in the process a cookie is created and stored at the web-browser on the operator station. However, it is not essential to use a cookie mechanism in this way. Any other suitable method can be used whereby information about the identity of the operator station is sent to the ERMS 21 together or associated with the transferred web-based information.

When the ERMS 21 receives the web-based information it appends that or incorporates that into the currently active response for the particular operator station involved. For example, in the case that an HTTP POST command is used, the ERMS 21 appends the POST content to the currently active response of the operator station identified in the cookie. Information that this process has been completed or the information itself is sent to the ERMS client 60 at the operator station, in order that any display showing the current status of the response can be updated. This is indicated by step 57 in FIG. 5. Steps 52 to 57 are then repeated as required until the operator has finished adding web-based information to the response. The operator is also able to edit the response using the ERMS client as known in the art. Once finished, the operator instructs the ERMS 21 to send the completed response to the customer. This is shown as step 58 in FIG. 5.

In the examples described above with reference to FIGS. 2, 3 and 5, the draft responses are held at the ERMS during their creation However, it is not essential for the responses to be held at the ERMS in that way. Instead this could be done at the client ERMS software on each station. However, it is advantageous to provide the main part of the functionality at the ERMS rather than at each client station, in order to reduce costs associated with maintaining and providing the client stations. For these reasons, it is preferred to use "thin client" software at the operator stations as far as possible.

Figure 4:
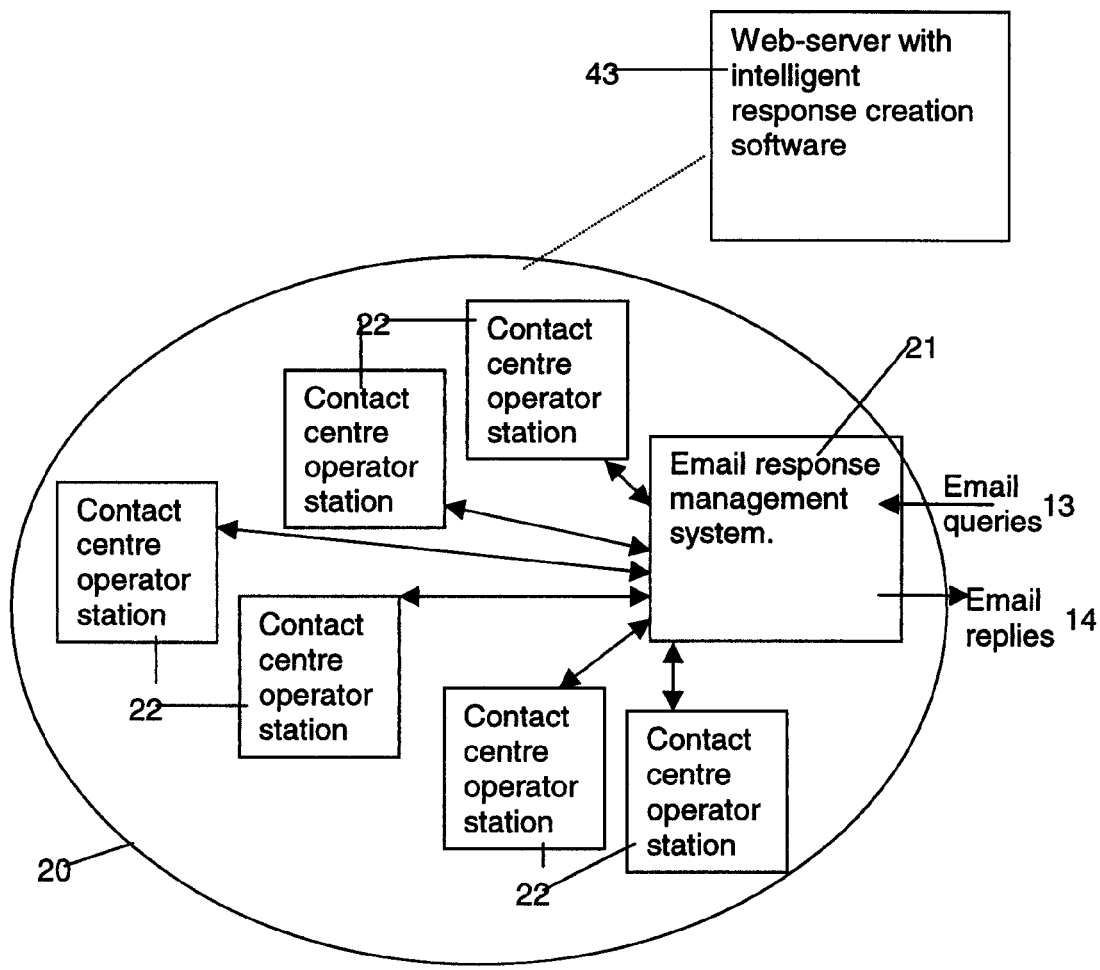
FIG. 4 is a schematic diagram of a system for generating responses to user queries according to another embodiment of the present invention.

In another embodiment, instead of using an ERMS to forward incoming customer queries to operator stations, the ERMS forwards those queries to the web server directly. This is illustrated in FIG. 4 which shows that the web-server comprises intelligent response creation software. That software receives an incoming query (for example, in the form of an email) and automatically generates a web page (or other web-based information) which comprises material from the web-server and/or other information sources (such as a knowledge database) that an operator may wish to add to a response. For example, this could comprise a standard opening paragraph, a plurality of pieces of web-based information, and a standard closing paragraph. Each of the pieces of web-based information (including the opening and closing paragraphs) are associated with an indicator and message as described above with reference to FIGS. 2 and 3.

A reference to the automatically generated web-based information or the information itself is returned to the ERMS and is sent to the contact centre operator station specified by the ERMS 21 together with the customer query itself. An operator at that station is then able to review the query and the suggested web-based information. The operator selects one of more of the indicators in the web-based information and the corresponding web-based information is transferred to the ERMS for incorporation into the active response. As in the methods of FIGS. 2, 3 and 5, information about the identity of the operator station is also sent to the ERMS. The method thus proceeds as per steps 56, 57 and 58 of FIG. 5. This embodiment provides the advantage that the operator does not need to actively seek information from the web-server. Rather that information is intelligently presented to him or her with the option to select particular portions. This reduces the time required for the operator to formulate a high quality response to the customer query.

In an extension of the above embodiments the format of the web-based information enables personalised information to be added to the response or for the response to be tailored to the particular customer involved. To do this the web-based information and the associated messages would contain references or variables to information about the user query and/or about the originator of the query. This would allow general usage web-based information to be provided which could generate personalised responses such as "Dear Mr. Jones, Thank you for your enquiry dated Mar. 26, 2002. . . ", etc. In one embodiment of this extension the conversion of the references or variables would be performed by the ERMS after receiving the message in step 56 and before it sends (the now modified) web-based information to the contact center operator station in step 57.

The references or variables in the web-based information message could take a number of forms including the following;

i) A set of pre-defined, and likely to be unique, text strings which could be simply searched and replaced by the ERMS. For example "###ERMS-variable###CustomerSurname".

ii) A set of pre-defined URL references which directly or indirectly reference the personalised information.

iii) Proprietary extensions or meta-tags to the HTML formatted web-based information which provide the required references and/or variables iv) An XML or other format based template which lists search and replace text. For example to replace all or only the first occurrence of "Dear Customer" with "Dear", <customer-title>, " ", <customer-surname>.

Method (iv) has the advantage that if the ERMS doesn't have the data or the capability to make the personalisation substitution then it can simply incorporate the web-based text as it is. With the other methods indicated the ERMS would always need the personalisation substitution capability and would need to have pre-defined default values for all possible references and variables (for example the default for "###ERMS-variable###CustomerSurname" might simply be "Customer").

In the examples described above an email response management system is discussed and the customer queries and replies to those are in the form of email. However, this is not essential. The replies to the queries must comprise web-based information but can otherwise be in any suitable form. For example, text chat, instant messaging, short message service (SMS) messages, video messages, audio messages or the like. Similarly, the incoming customer or user queries can be in any suitable form rather than just email and the management system arranged to deal with the particular media required Thus in a preferred example, the contact centre is a multimedia contact centre that is able to deal with incoming queries in a plurality of media.

As an example, consider the situation where the web-based information comprises video clips that are selected by an operator in a particular order and appended together by the management system. These are then sent to a customer either as a video stream or as a message which contains the ordered video clips for access by the customer at his or her convenience.

The invention claimed is:

1. A method of enabling web-based information to be used to generate a response to a user composed email composed email query message, said method comprising the steps of:
   (i) receiving requested web-based information at a web-browser together with one or more indicators, each indicator being associated with a particular part of the web-based information and also associated with a message arranged to send the particular part of the web-based information to a management system at a pre-specified location;
   (ii) receiving operator input selecting at least one of the indicators and executing the message associated with that indicator such that the associated particular part of the web-based information is sent to the management system for incorporation in the response to the user composed email query message.

2. A method as claimed in claim 1 which further comprises prior to said step (i) of receiving, the step of requesting the web-based information from a web-server using the web-browser.

3. A method as claimed in claim 1 wherein said web-based information is provided to the web-browser by an automatic response generation system.

4. A method as claimed in claim 1 wherein said step (ii) further comprises sending information about the identity of the web-browser or its operator to the management system together with the particular part of the web-based information.

5. A method as claimed in claim 1 wherein said web-browser is associated with one of a plurality of call centre agents in a contact centre.

6. A method as claimed in claim 1 wherein said management system is selected from an email response management system and a text-chat management system.

7. A method as claimed in claim 1 wherein said step (i) of requesting web-based information from a web-server comprises issuing a request from the web-browser to the web-server via a web-server proxy.

8. A method as claimed in claim 7 wherein said web-server proxy is arranged to add said indicators to said web-based information dynamically.

9. A method as claimed in claim 1 wherein the indicators associated with particular parts of the web-based information are pre-specified and stored at the web-server together with the web-based information.

10. A method as claimed in claim 1 wherein said message comprises a hyper-text transfer protocol (HTTP) POST command.

11. A method as claimed in claim 1 wherein said message comprises an indicator which indicates how the web-based information is to be incorporated into the response.

12. A method as claimed in claim 1 wherein said web-based information is incorporated into the response in a manner selected from direct insertion as HTML, conversion to plain text, as an email attachment, or as a URL reference.

13. A method as claimed in claim 1 wherein said web-based information is provided in HTML format throughout the method.

14. A method as claimed in claim 1 wherein the particular part of the web-based information is incorporated into the response without changing the format of the particular part of the web-based information.

15. A system for enabling web-based information to be used to generate a response to a user composed email query message, said system comprising:
   (i) a web-browser arranged to receive requested web-based information together with one or more indicators, each indicator being associated with a particular part of the web-based information and also associated with a message arranged to send the particular part of the web-based information to a management system at a pre-specified location;
   (ii) a user-interface arranged to receive operator input selecting at least one of the indicators; and
   (iii) a processor arranged to execute, in the event that an indicator is selected, the message associated with that indicator such that the associated particular part of the web-based information is sent from the web-browser to the management system for incorporation in the response to the user composed email query message.

16. A system as claimed in claim 15 which further comprises a web-server comprising the web-based information, associated indicators and associated messages.

17. A system as claimed in claim 15 which further comprises a web-server comprising the web-based information and a web-server proxy which is arranged to provide the indicators and messages associated with the web-based information.

18. A contact centre management system for use in a contact centre comprising a plurality of contact centre operator stations each with a web-browser, said contact centre management system comprising:
   (i) an allocator arranged to allocate incoming user composed email query messages between the contact centre operator stations;
   (ii) an output arranged to send responses to the user composed email query messages;
   (iii) a processor arranged, for each operator station, to maintain at least one active response to a user composed email query message that is in the process of being formulated by an operator at that operator station;
   (iv) an input arranged to receive a message from a web-browser at any of the contact centre operator stations said message being arranged to cause associated web-based information to be sent to the contact centre management system; and wherein said processor is further arranged to input said web-based information into an active user composed email query message response.

19. A contact centre management system as claimed in claim 18 wherein said processor is arranged to input said web-based information into an active response without substantially changing the format of the web-based information.

20. A contact centre management system as claimed in claim 18 wherein said input is further arranged to receive information about the identity of an operator station associated with the message.

21. A contact centre management system as claimed in claim 20 wherein said identity information is provided using a cookie stored at the web-browser of the operator station.

22. A contact centre management system as claimed in claim 18 wherein said message comprises an HTTP POST command.

23. A method of operating a contact centre management system in a contact centre comprising a plurality of contact centre operator stations each with a web-browser, said method comprising the steps of:
   (i) receiving at least one user composed email query message and allocating that query message to one of the contact centre operator stations;
   (ii) maintaining an active user composed email query message response which is in the process of being formulated by the associated contact centre operator;
   (iii) receiving and activating a message from a web-browser at the associated contact centre operator station; said message being arranged to cause associated web-based information to be sent to the contact centre management system; and
   (iv) inputting said web-based information to the active user composed email query message response.

24. A computer program stored on a computer readable medium and arranged to carry out the method of any of claims 1.

25. A contact centre comprising a contact centre management system as claimed in claim 18.

26. A method as claimed in claim 1 wherein said web-based information comprises items representing other information and arranged to be replaced by that other information prior to or during the incorporation of the web-based information into the response.

27. A method as claimed in claim 24 wherein said items represent information about any of the user query message and a user associated with the user query message.

28. A method as claimed in claim 24 wherein said items have a form selected from: pre-defined text strings, pre-defined URL references, meta-tags, XML template or template listing search and replace text.

29. A method as claimed in claim 26 which further comprises, at the management system, replacing any of said items representing other information by information accessed by the management system.

30. A contact centre management system as claimed in claim 18 wherein said associated web-based information comprises items representing other information and arranged to be replaced by that other information.

31. A contact centre management system as claimed in claim 30 wherein information accessible to the contact centre management system is used to replace the items in the web-based information with the information represented by those items before incorporation into the response.

* * * * *